US008253276B2

(12) United States Patent
Koya

(10) Patent No.: US 8,253,276 B2

(45) Date of Patent: Aug. 28, 2012

(54) POWER SUPPLY DEVICE, METHOD THEREOF, AND IMAGE FORMING DEVICE

(75) Inventor: Daisuke Koya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1078 days.

(21) Appl. No.: 11/790,362

(22) Filed: Apr. 25, 2007

(65) Prior Publication Data

US 2007/0286631 A1 Dec. 13, 2007

(30) Foreign Application Priority Data

May 16, 2006 (JP) ................................ 2006-136610
Apr. 3, 2007 (JP) ................................ 2007-097532

(51) Int. Cl.
*H02J 1/00* (2006.01)

(52) U.S. Cl. .......................................... 307/75; 307/66

(58) Field of Classification Search .................... 714/54; 323/318, 283; 320/116; 307/130, 66, 75
See application file for complete search history.

(56) References Cited

U.S. PATENT DOCUMENTS

| | | | | |
|---|---|---|---|---|
| 5,929,602 | A * | 7/1999 | Suzuki | 320/116 |
| 6,297,972 | B1 * | 10/2001 | Chen | 363/37 |
| 7,148,659 | B2 * | 12/2006 | Lanni | 363/142 |
| 7,701,600 | B2 * | 4/2010 | Fujishige et al. | 358/1.15 |
| 2004/0067740 | A1 | 4/2004 | Handa et al. | |
| 2005/0182991 | A1 * | 8/2005 | Kawakubo | 714/54 |
| 2007/0210775 | A1 * | 9/2007 | Bothra et al. | 323/283 |

FOREIGN PATENT DOCUMENTS

| | | |
|---|---|---|
| CN | 2393263 | 8/2000 |
| JP | 04-304160 | 10/1992 |
| JP | 08-140287 | 5/1996 |
| JP | 09-065585 | 3/1997 |
| JP | 10-337014 | 12/1998 |
| JP | 2000-116029 | 4/2000 |
| JP | 2003-047238 | 2/2003 |

OTHER PUBLICATIONS

Japanese Office Action dated Feb. 5, 2012 issued in corresponding Japanese Application No. 2007-097532.

* cited by examiner

*Primary Examiner* — Daniel Cavallari
(74) *Attorney, Agent, or Firm* — Harness, Dickey & Pierce, P.L.C.

(57) ABSTRACT

A power supply device is disclosed that is able to satisfy requirements of a device in connection and has high efficiency.

The power supply device includes a first power supply; a voltage step-up unit that steps up an output voltage of the first power supply; a voltage step-down unit that steps down an output voltage of the voltage step-up unit; and a load that is driven to operate by an output voltage of the voltage step-down unit. The voltage step-up unit steps up the output voltage of the first power supply to a lower limit of an operating voltage of the voltage step-down unit.

16 Claims, 12 Drawing Sheets

POWER SUPPLY DEVICE, METHOD THEREOF, AND IMAGE FORMING DEVICE

BACKGROUND OF THE INVENTION

1. Field of the Invention

The present invention relates to a power supply device which supplies power to a circuit component, such as a semiconductor memory device or other memory devices, a method of the power supply device, and an image forming device including the power supply device.

2. Description of the Related Art

In various electronic devices, in order to prevent data loss in a memory caused by sudden power failure or trouble with a power supply, usually it is necessary to back up the memory in which the data are stored. Especially during data transmission, for example, by a facsimile machine or others, it is highly recommended to back up a memory integrated circuit (IC) which stores the received data or the data to be transmitted. In the related art, it is known that various techniques are used for this purpose, such as backup by using a super capacitor, or a power supply circuit technique using a single-cell battery to boost the power voltage.

In recent years, along with progress in semiconductor processing techniques, the integration degree of the integrated circuit (IC) keeps on increasing, and the inner structure of the integrated circuit (IC) is more and more miniaturized. Along with miniaturization of the integrated circuit (IC), the operating power voltage of semiconductors tends to be reduced in order to prevent damage inside the semiconductor that might occur were a high voltage to be applied to the semiconductor. On the other hand, along with an increasing scale of the electronic circuits and a rising operating frequency due to miniaturization of the IC, a consumption power current becomes large. In the future, along with more and more progress in the semiconductor processing techniques, it is expected that the inner structure of the integrated circuit (IC) will be more miniaturized, the operating power voltage will be lower, and the consumption power current will be larger. However, in the related art as described above, it is difficult to maintain a low operating power voltage and a large consumption power current, while ensuring to back up for a long time.

For example, in the backup technique using a super capacitor, in order to ensure back up for a long time, it is necessary to increase the capacity of the capacitor; due to this, the size of the capacitor increases. Hence, in order to obtain a long backup time period, the size of the electronic device becomes large. Further, since a capacitor having a large capacity is very expensive presently, using such a capacitor increases fabrication cost of the electronic device.

It is known that generally, the power supply circuit technique which uses a single-cell battery to boost the power voltage is capable of backup for a relatively long time without increasing the size of the electronic device compared to the backup technique using the super capacitor.

FIG. 8 is a block diagram illustrating a general circuit configuration for implementing the above power supply circuit technique.

As shown in FIG. 8, a power voltage V1 from a primary power supply 3, which is used as a usual power supply, or a power voltage V2 from an auxiliary power supply 4, is boosted through a DC-DC converter 2 to generate an operating voltage V0 to back up a device 1.

The usual power voltage V1 is used under usual operating conditions of the device 1, it is generated from an Alternating Current (AC) power supply, and is supplied by the primary power supply 3, namely, the usual power supply.

The auxiliary power voltage V2 is used under back operations of the device 1, it is generated from a Direct Current (DC) power supply, and is supplied by the auxiliary power supply 4. The auxiliary power supply 4 may be a Direct Current (DC) power supply. In addition, the Direct Current (DC) power supply may be a battery or capacitor, and its output voltage varies along with its discharging state.

Both of the usual power voltage V1 and the auxiliary power voltage V2 are lower than the operating voltage V0 of the device 1, and thus it is necessary for the DC-DC converter 2 to increase the usual power voltage V1 and the auxiliary power voltage V2.

In the circuit configuration of the power supply circuit technique, in order to respond to requirements of low operating voltage operations and increased currents of integrated circuits, it is required that the DC-DC converter 2 be able to work in a wide current range from a backup current to an operating current (for example, a few mA to a few amperes), and it is further required that the DC-DC converter 2 be capable of not only voltage step-up but also voltage step-down. When the device 1 is able to operate at a low voltage, usually, the usual power voltage V1 and the auxiliary power voltage V2 may be higher than the operating voltage V0 of the device 1, and in this case, it is required that the DC-DC converter 2 decrease the usual power voltage V1 and the auxiliary power voltage V2 to the operating voltage V0. As described above, the auxiliary power voltage V2 gradually decreases along with the discharging of the single-cell battery. As a result, when the auxiliary power voltage V2 becomes lower than the operating voltage V0, it is necessary to switch the operating mode of the DC-DC converter 2 to increase the auxiliary power voltage V2.

For example, Japanese Laid-Open Patent Application No. 9-65585 (hereinafter referred to as "reference 1") discloses a battery backup power supply circuit capable of backup with a single-cell backup battery.

FIG. 9 is a circuit diagram illustrating an embodiment of the battery backup power supply circuit disclosed in reference 1.

FIG. 10 is a block diagram illustrating a functional configuration of the battery backup power supply circuit as shown in FIG. 9.

Note that the reference symbols in FIG. 10 correspond to the reference symbols assigned to the components of the battery backup power supply circuit shown in FIG. 9.

According to the configurations shown in FIG. 9 and FIG. 10, the battery backup power supply circuit is able to switch an input to the DC-DC converter between a usual operation mode and a backup operation mode, thereby, generating the power to a backup memory and a control circuit of the backup memory by the DC-DC converter.

However, since the battery backup power supply circuit disclosed in reference 1 switches the input to the DC-DC converter between the usual operation mode and the backup operation mode to implement voltage-step-up and voltage-step-down required in different operation modes, the battery backup power supply circuit is strongly dependent on the performance of the one DC-DC converter.

In the backup operations, in order to extend as much as possible the backup time period of the auxiliary power supply 4, it is necessary to use a power supply circuit of low power consumption and thus high efficiency. On the other hand, in the usual operations, it is necessary to use a power supply circuit able to conduct a large current in order to respond to requirements of an increased circuit scale due to the miniaturized ICs and increased operating frequencies.

However, in the power supply circuit disclosed in reference 1, the one DC-DC converter is commonly used in the backup operations and the usual operations, it is clear that there is a limit in optimizing the performance of the power supply circuit.

Generally, the DC-DC converter presently used has an efficiency change along with the magnitude of its current. When the DC-DC converter is used in a power supply circuit to support low operating voltage operations and increased currents of integrated circuits, as described above, it is required that the DC-DC converter be able to work in a wide current range. As a result, even when the DC-DC converter is optimized to have high efficiency in the backup operations involving a small current, the efficiency of the DC-DC converter declines in the usual operations involving a large current. This is not preferable from an energy-saving point of view.

On the other hand, even when the DC-DC converter is optimized to have high efficiency in the usual operations involving a large current, the efficiency of the DC-DC converter declines in the backup operations involving a small current, and the back-up time period becomes short. Among existing DC-DC converters, which are able to step-up and step-down voltages, support operations involving a large current, and have high efficiency, the available maximum current is only about 1 A; it is difficult to use these existing DC-DC converters to respond to the requirements of further lowered voltages and increased current and additional installation of memories caused by further progress in the semiconductor processing technology in the future. Further, the above DC-DC converters are also expensive, resulting in high cost.

As described above, in the related art, it is difficult to meet various conditions required by the devices to be backed up, while ensuring a long backup time period.

SUMMARY OF THE INVENTION

The present invention may solve one or more problems of the related art.

A preferred embodiment of the present invention may provide a power supply device able to satisfy requirements of a device in connection and having high efficiency, a method of the power supply device, and an image forming device.

According to a first aspect of the present invention, there is provided a power supply device, comprising:

a first power supply, a voltage step-up unit that steps up an output voltage of the first power supply;

a voltage step-down unit that steps down an output voltage of the voltage step-up unit; and a load that is driven to operate by an output voltage of the voltage step-down unit, wherein the voltage step-up unit steps up the output voltage of the first power supply to a lower limit of an operating voltage of the voltage step-down unit.

According to the present invention, it is possible to provide a power supply device able to satisfy requirements of the load and having high efficiency. For example, when the load may be a memory IC (integrated circuit), and the first power supply may be a battery or a capacitor, it is possible to extend the back-up time period.

As an embodiment, the lower limit of the operating voltage is associated with an operating voltage of the load. Preferably, the lower limit of the operating voltage is further associated with a voltage drop on the voltage step-down unit.

According to an embodiment of the present invention, it is possible to minimize the electric power loss in the voltage step-down unit.

As an embodiment, the power supply device further comprises:

a second power supply that supplies electric power in a usual operation of the power supply device; and a power supply switching unit that, when the second power supply stops power supply and the first power supply starts to supply electric power, switches the output voltage of the first power supply stepped up by the voltage step-up unit to an output voltage of the second power supply, and supplies the output voltage of the first power supply to the voltage step-down unit.

According to an embodiment of the present invention, in the power supply device in which the first power supply acts as an auxiliary power supply, and the second power supply acts as a primary power supply, voltage stepping-up and voltage stepping-down are carried out in separate sections, while in the related art, voltage stepping-up and voltage stepping-down are carried out in the same unit. Due to this, a flow of electrical power supplied by the primary power supply and a flow of electrical power supplied by the auxiliary power supply are different from each other. Therefore, it is possible to provide a power supply device able to satisfy requirements of operation states and ensure high efficiency. In other words, it is possible to respond to requirements of low voltages and increased current of a device serving as the load, and it is possible to extend the backup time period.

Preferably, the power supply device further comprises:

a switch that is provided on an output side of the first power supply, and controls the output voltage of the first power supply.

According to an embodiment of the present invention, it is possible to prevent unnecessary power consumption of the auxiliary power supply.

As an embodiment, the power supply switching unit includes a first diode that is provided on the output side of the first power supply and is in a forward state, and a second diode that is provided on the output side of the second power supply and is in the forward state.

According to an embodiment of the present invention, the output voltage of the first power supply and the output voltage of the second power supply can be compared; when the former is higher than the latter, the first diode is turned ON, and the second diode is turned OFF; when the former is lower than the latter, the first diode is turned OFF, and the second diode is turned ON. In this way, it is possible to switch the output voltage of the first power supply and the output voltage of the second power supply even without a separate control device.

As an embodiment, the first power supply is a battery or a capacitor.

According to a second aspect of the present invention, there is provided an image forming device, comprising:

a power supply device, wherein the power supply device includes

- a first power supply,
- a voltage step-up unit that steps up an output voltage of the first power supply;
- a voltage step-down unit that steps down an output voltage of the voltage step-up unit; and
- a load that is driven to operate by an output voltage of the voltage step-down unit, wherein the voltage step-up unit steps up the output voltage of the first power supply to a lower limit of an operating voltage of the voltage step-down unit.

According to an embodiment of the present invention, the power supply device of the present invention is installed in an image forming device. Due to this, when there are many circuit components, such as a memory, which ought to be backed up when the power of the image forming device is off, it is possible to back up a larger number of circuit components than the battery backup power supply circuit in the related art without changing circuit configurations and circuit scales. In addition, when further progress is made in lowering the operating voltage and increasing the current of the circuit components, it is possible to easily respond to the requirements of lowered voltages and increased current.

According to a third aspect of the present invention, there is provided a method of a power supply device including a first power supply and a load for driving the load to operate, said method comprising the steps of:

stepping up an output voltage of the first power supply;

stepping down the output voltage of the first power supply stepped-up in the step of stepping up; and driving the load to operate with the voltage stepped down in the step of stepping down, wherein in the step of stepping up, the output voltage of the first power supply is stepped up to a value associated with an operating voltage of the load.

As an embodiment, in the step of stepping up, the output voltage of the first power supply is stepped up to a voltage drop occurring in the step of stepping-down in addition to the operating voltage of the load.

As an embodiment, the power supply device further includes a first power supply that supplies electric power in a usual operation of the power supply device, said method further comprising:

a power supply switching step of, when the second power supply stops power supply and the first power supply starts to supply electric power, switching the stepped up output voltage of the first power supply to an output voltage of the second power supply, wherein in the step of stepping down, one of the output voltage of the first power supply and the output voltage of the second power supply is selected in the power supply switching step, and is stepped down.

According to a fourth aspect of the present invention, there is provided a power supply device, comprising:

a first power supply, a voltage step-down unit that steps down an output voltage of the first power supply; and a voltage step-up unit that steps up an output voltage of the voltage step-down unit, and outputs the stepped-up voltage to a load, wherein the voltage step-down unit steps down the output voltage of the first power supply to a lower limit of an operating voltage of the voltage step-up unit.

According to a fifth aspect of the present invention, there is provided an image forming device, comprising:

a power supply device, wherein the power supply device includes a first power supply, a voltage step-down unit that steps down an output voltage of the first power supply; and a voltage step-up unit that steps up an output voltage of the voltage step-down unit, and outputs the stepped-up voltage to a load, wherein the voltage step-down unit steps down the output voltage of the first power supply to a lower limit of an operating voltage of the voltage step-up unit.

According to a sixth aspect of the present invention, there is provided a method of a power supply device including a first power supply and for driving a load, said method comprising the steps of:

stepping down an output voltage of the first power supply; and stepping up the output voltage of the first power supply stepped-down in the step of stepping down; and outputting the voltage stepped up in the step of stepping up to the load, wherein in the step of stepping down, the output voltage of the first power supply is stepped down to a value associated with an operating voltage of the load.

According to an embodiment of the present invention, since the voltage stepping-up and stepping-down operations are separate from each other, one of the voltage stepping-up operation and the stepping-down operation which is earlier is optimized so that the power loss of the other one of the voltage stepping-up operation and the stepping-down operation which at later stages is minimized. Thereby, it is possible to improve the efficiency of the power supply device while satisfying requirements of the device in connection.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Configuration

Figure 1:
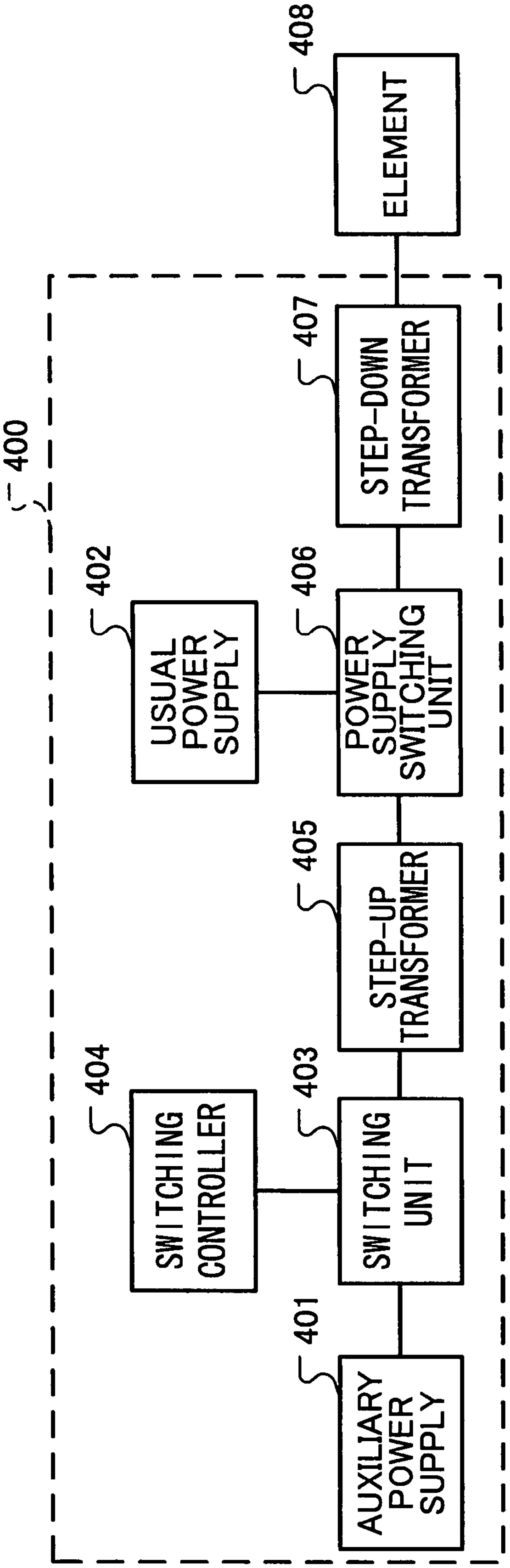
FIG. 1 is a block diagram illustrating an example of an overall configuration of a power supply device according to a first embodiment of the present invention.

FIG. 1 is a block diagram illustrating an example of an overall configuration of a power supply device according to a first embodiment of the present invention.

As shown in FIG. 1, a power supply device 400 is connected to one or more devices 408 and supplies a power voltage to drive the device 408 to operate. The power supply device 400 includes an auxiliary power supply 401, a usual power supply (primary power supply) 402, a switching unit 403, a switching controller 404, a step-up transformer 405, a power supply switching unit 406, and a step-down transformer 407.

The usual power supply 402 supplies the power voltage to the device 408 when components of an apparatus including the power supply device 400 are in usual operations. The auxiliary power supply 401 supplies the power voltage to the device 408 in backup operations, namely, when the usual power supply 402 stops power supply to the device 408. For example, the auxiliary power supply 401 may be a battery or a capacitor.

The switching unit 403 switches ON or switches OFF power supplied from the auxiliary power supply 401 under certain conditions.

The switching controller 404 controls the switching operations of the switching unit 403 pursuant to preset conditions.

The step-up transformer 405 steps up an output voltage of the auxiliary power supply 401 to a certain value.

The power supply switching unit 406 switches between the output voltages of the auxiliary power supply 401 and the usual power supply 402 according to operations of the switching unit 403.

The step-down transformer 407 steps down the output voltage of the usual power supply 402 in usual operations, and the output voltage of the auxiliary power supply 401 in backup operations to the operating voltage of the device 408.

Figure 2:
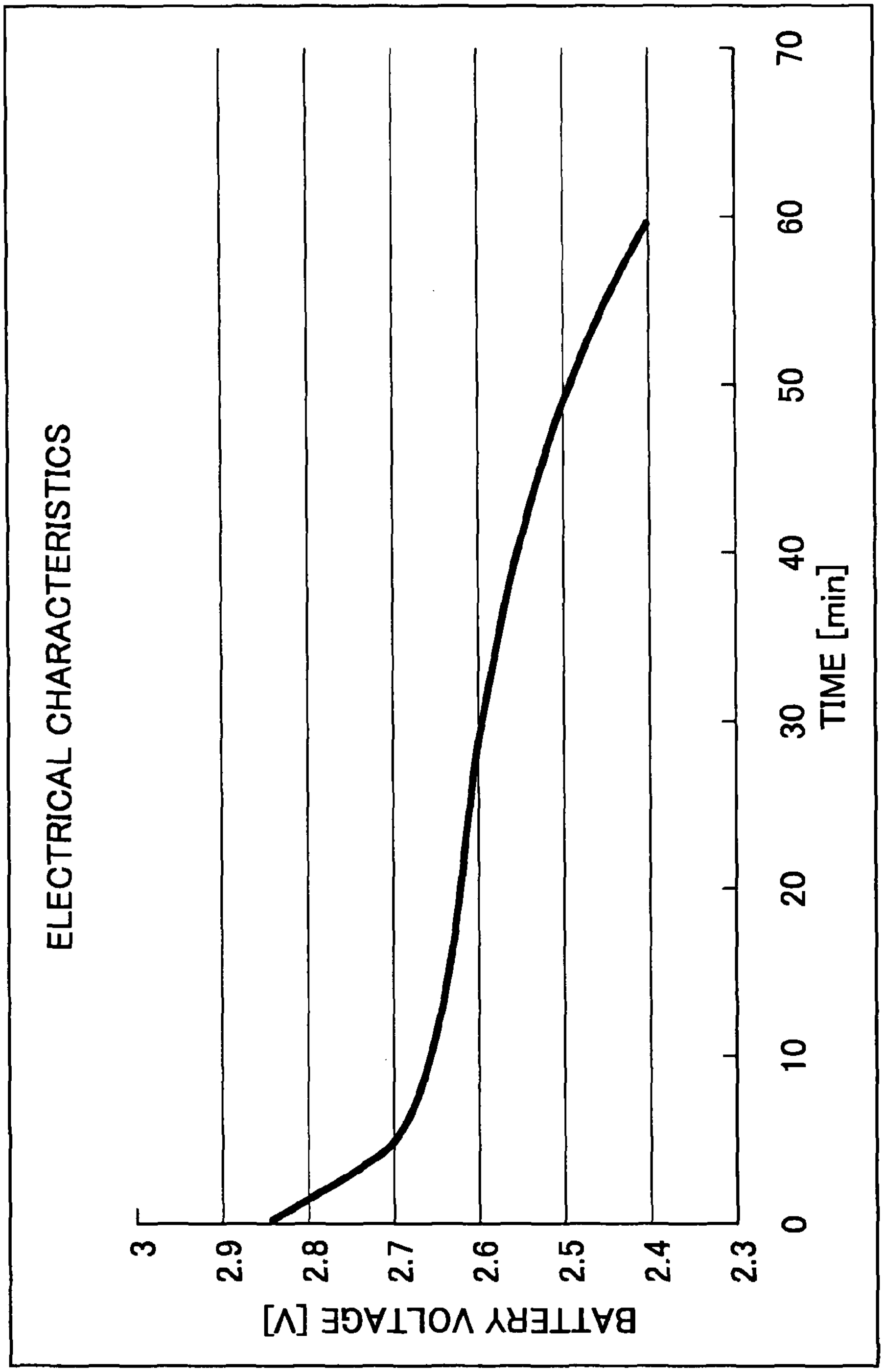
FIG. 2 is a graph illustrating a discharging characteristic when a lithium secondary battery is used as the auxiliary power supply 401.

FIG. 2 is a graph illustrating discharging characteristic when a lithium secondary battery is used as the auxiliary power supply 401.

FIG. 2 shows discharging characteristic with the secondary battery supplying a constant current of 10 mA. FIG. 2 reveals that when a battery is used as the auxiliary power supply 401, the output voltage of the battery declines gradually. Because the output voltage of the auxiliary power supply 401 changes due to discharging of the auxiliary power supply 401, in order to obtain a constant voltage, it is necessary to step up the voltage of the auxiliary power supply 401 to a certain value, and then step down the voltage.

[Operations]

Next, operations of the power supply device 400 are explained with reference to FIG. 3A and FIG. 3B.

Figure 3A:
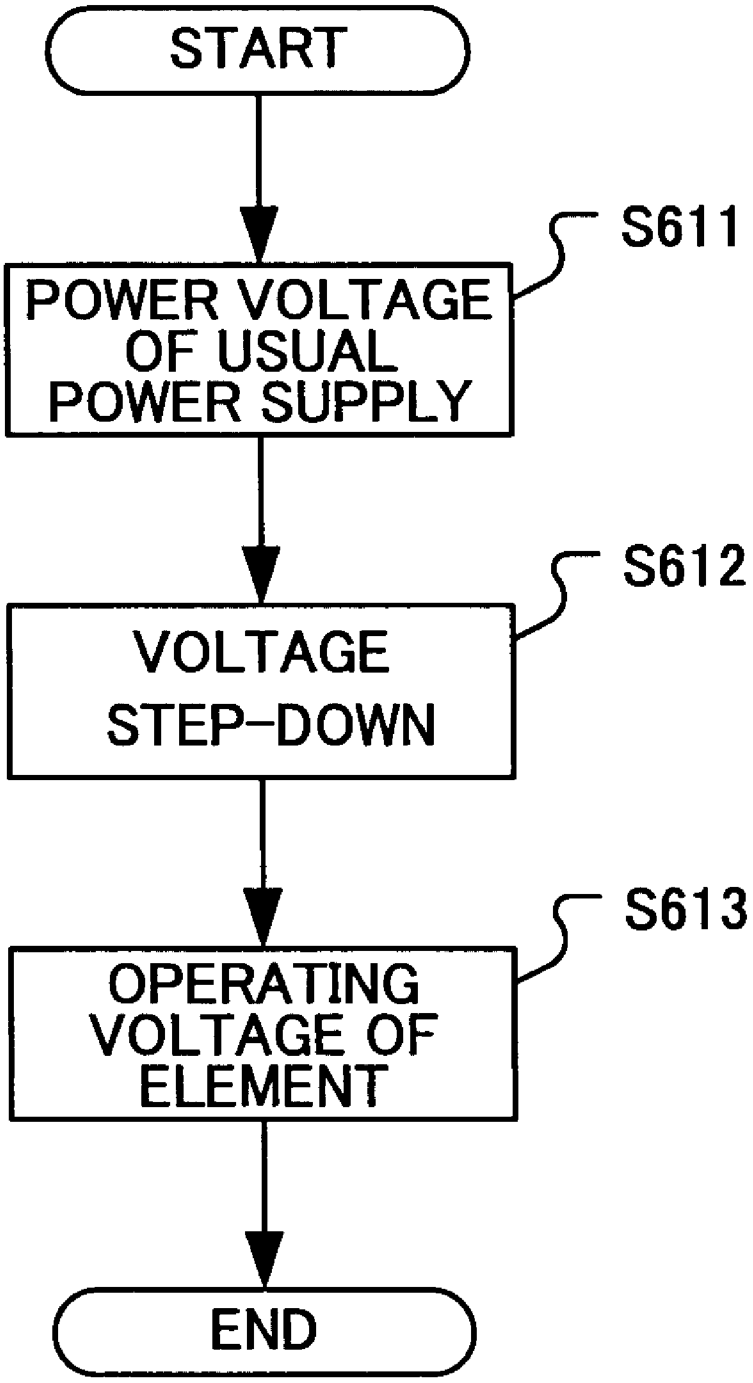
FIG. 3A is a flowchart illustrating usual operations of the power supply device 400 as shown in FIG. 1.

FIG. 3A is a flowchart illustrating usual operations of the power supply device 400 as shown in FIG. 1.

In the usual operations, as described above, the usual power supply 402 is used to supply the power voltage to the device 408.

In step S611, when the not-illustrated apparatus having the power supply device 400 is powered on, the usual power supply 402 supplies a DC (direct current) voltage generated from an AC (Alternating Current) power supply. Usually, the voltage from the usual power supply 402 is higher than the operating voltage of the device 408, which is to receive the power supply.

In step S612, the usual power voltage, which is the DC voltage supplied by the usual power supply 402, is supplied to the step-down transformer 407 through the power supply switching unit 406. The step-down transformer 407 steps down the usual power voltage to the operating voltage of the device 408.

In step S613, the lowered usual power voltage is supplied to the device 408 as the operating voltage of the device 408.

The above operations are carried out successively when the apparatus having the power supply device 400 is turned ON.

Figure 3B:
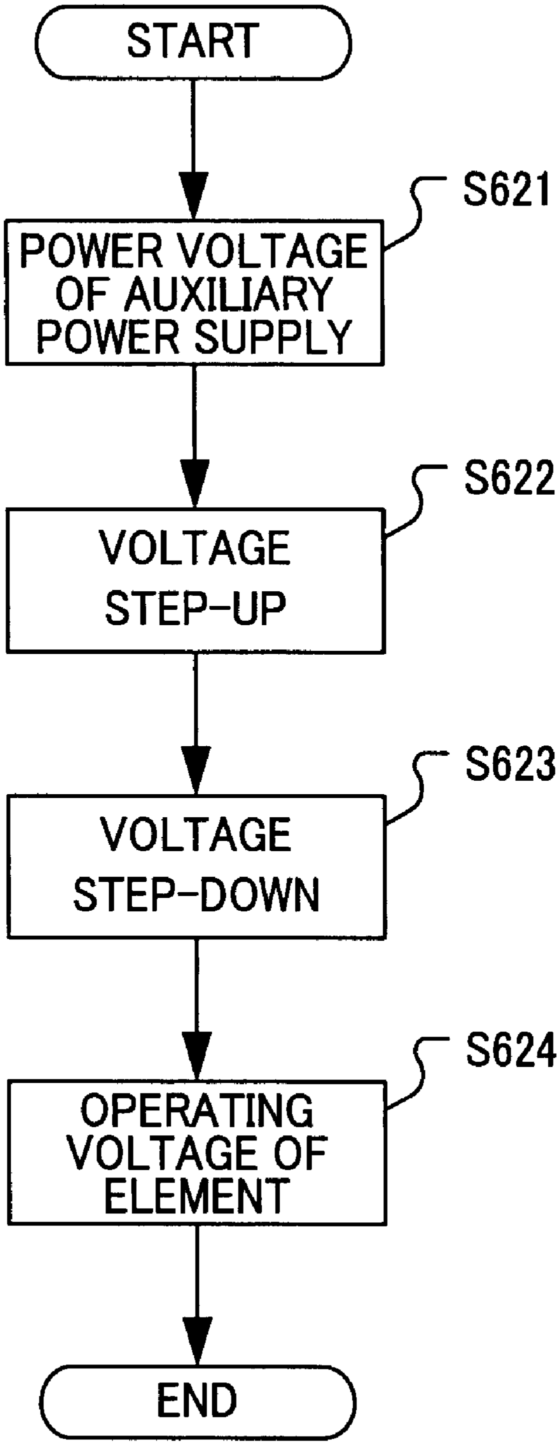
FIG. 3B is a flowchart illustrating backup operations of the power supply device 400 as shown in FIG. 1.

FIG. 3B is a flowchart illustrating backup operations of the power supply device 400 as shown in FIG. 1.

In the backup operations, as described above, the auxiliary power supply 401 is used to supply the power voltage to the device 408.

In step S621, when the apparatus having the power supply device 400 stops operations temporarily, and power supply from the usual power supply 402 is interrupted, the auxiliary power supply 401 supplies an auxiliary power voltage. As shown in FIG. 2, the auxiliary power voltage changes with time.

In step S622, the auxiliary power voltage is stepped up by the step-up transformer 405 to a certain value. Since in the subsequent step, the stepped-up auxiliary power voltage is stepped down to the operating voltage of the device 408, preferably, the certain value of the stepped up auxiliary power voltage is not lower than the operating voltage of the device 408 and results in the minimum power loss in the step-down transformer 407. For example, in the present embodiment, the certain value equals the operating voltage of the device 408+a voltage drop in the step-down transformer 407. According to example embodiments, the voltage drop in the step-down transformer 407 may be an amount of voltage by which the input of the step-down transformer 407 is "stepped-down" to produce the output voltage of the step-down transformer 407.

In step S623, the stepped-up auxiliary power voltage is supplied to the step-down transformer 407 through the power supply switching unit 406. The step-down transformer 407 steps down the stepped-up auxiliary power voltage to the operating voltage of the device 408.

In step S624, the stepped-up and stepped-down auxiliary power voltage is supplied to the device 408 as the operating voltage.

The above operations are carried out successively in the backup operations of the apparatus having the power supply device 400.

[Circuit Configuration]

Next, examples of the power supply device of the present embodiment are explained.

Figure 4:
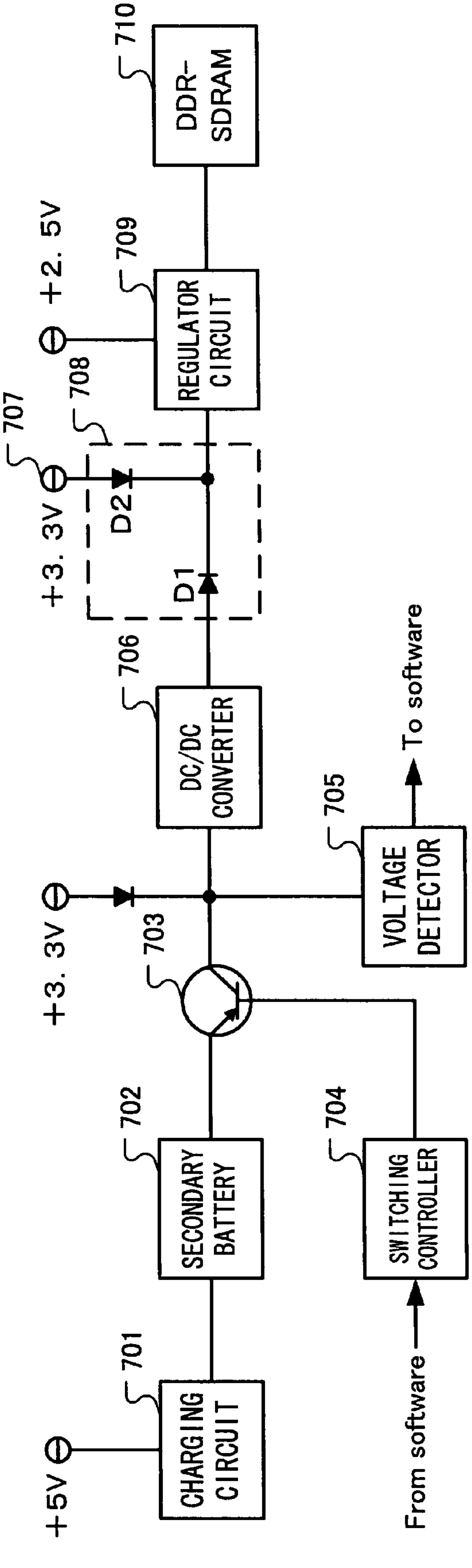
FIG. 4 is a block diagram illustrating the power supply device of the first embodiment.

FIG. 4 is a block diagram illustrating the power supply device of the first embodiment.

The power supply device shown in FIG. 4 is a battery backup power supply circuit in which a memory device 710, for example, a DDR-SDRAM (Double Data Rate—Synchronous Dynamic Random Access Memory), acts as a backup memory.

The power supply device in FIG. 4 includes a charging circuit 701, an auxiliary power supply 702, a switching unit 703, a switching controller 704, a voltage detector 705, a step-up transformer 706, a usual power supply 707, a power supply switching unit 708, and a step-down transformer 709.

The charging circuit 701 charges the auxiliary power supply 702, and uses a +5 V DC power voltage, which is generated from an AC power supply by a separate not-illustrated power supply circuit of the apparatus having the battery backup power supply circuit, to charge the auxiliary power supply 702.

The auxiliary power supply 702 is a power supply used in the backup operations of the apparatus having the power supply device in FIG. 4. For example, in the present embodiment, the auxiliary power supply 702 may be a single-cell lithium secondary battery. In addition, for example, the nominal voltage of the secondary battery is 3.0 V, and the nominal capacity of the secondary battery is 100 mAh.

The switching unit 703 switches ON or switches OFF the power supplied from the auxiliary power supply 702 to the memory device 710. For example, in the present embodiment, the switching unit 703 is a pnp transistor.

The switching controller 704 controls the ON/OFF switching operations of the switching unit 703 according to preset conditions of an ON/OFF state of the usual power supply 707, a memory status of the memory device 710 (namely, whether object data are held), and/or a voltage state of the secondary battery 702; then the switching controller 704 outputs a control signal to the switching unit 703.

In the present embodiment, the control signal is input to a base electrode of the switching unit 703 so that the switching unit 703 is turned on in the backup operations, and is turned off in the usual operations. In addition, the above-mentioned conditions may be input through software, which is executed by a CPU (Central Processing Unit) of the apparatus having the power supply device in FIG. 4.

The voltage detector 705 monitors the voltage of the secondary battery 702 in order to prevent over-discharging of the secondary battery 702. In the present embodiment, the voltage detector 705 is connected to an emitter electrode of the switching unit 703, and detects the output voltage of the secondary battery 702 via the switching unit 703. When a voltage lower than a certain value is detected, the voltage detector 705 sends a notification to the switching controller 704 by software so that the switching unit 703 is turned off.

The step-up transformer 706 steps up an output voltage of the secondary battery 702 supplied through the switching unit 703 to a certain voltage. In the present embodiment, in order to maintain the conversion efficiency above a specified value, a DC-DC converter of the related art is used. In addition, in the present embodiment, the "certain voltage" is 3.0 V, namely, the nominal voltage of the secondary battery 702. Since the increased voltage value is set to be as small as possible, the conversion efficiency of the DC-DC converter is improved. Further, in the backup operations, since the current required by the memory device 710 is on the order of mA, by selecting a DC-DC converter having high efficiency at low operating current, the power consumption of the secondary battery 702 can be reduced.

The usual power supply 707 supplies the power voltage in usual operations of the apparatus having the power supply device in FIG. 4. In the present embodiment, a +3.3 V DC power voltage is used as the usual power supply 707, which is generated from an AC power supply by a separate not-illustrated power supply circuit of the apparatus having the battery backup power supply circuit.

The power supply switching unit 708, together with the switching unit 703, switches the power flow in the usual operations and in the backup operations. In the present embodiment, the power supply switching unit 708 includes a first diode D1 and a second diode D2. The first diode D1 is provided between the DC/DC converter 706 and regulator circuit 709 in a forward state to rectify power supplied from the secondary battery 702 in the backup operations. The second diode D2 is provided between the usual power supply 707 and the regulator circuit 709 in a forward state to rectify power supplied from the usual power supply 707 in the usual operations.

According to the above circuit configuration, the output voltage of the secondary battery 702 stepped up by the DC/DC converter 706 and the output voltage of the usual power supply 707 can be compared, when the output voltage of the secondary battery 702 stepped up by the DC/DC converter 706 is larger than the output voltage of the usual power supply 707, the first diode D1 is turned ON and the second diode D2 is turned OFF; when the output voltage of the secondary battery 702 stepped up by the DC/DC converter 706 is smaller than the output voltage of the usual power supply 707 stepped up by the DC/DC converter 706, the first diode D1 is turned OFF and the second diode D2 is turned ON.

In order to reduce electric loss as much as possible, Schottky barrier diodes can be used as the first diode D1 and the second diode D2.

The regulator circuit 709 steps down the output voltage of the usual power supply 707 in the usual operations and the output voltage of the secondary battery 702 in the backup operations to the operating voltage of the memory device 710. In the present embodiment, in order to meet the requirements of a large current of the memory device 710, for example, the regulator circuit 709 may be operable at a current up to a few amperes, such as low-saturation regulators. In order to reduce power loss in the regulators as much as possible, it is preferable to use regulators each having a small consumption current, and a small difference between an input voltage and an output voltage thereof.

The memory device 710 is the backup memory backed up by the power supply device of the first embodiment. For example, the memory device 710 may be a SDR-SDRAM (Single Data Rate—Synchronous Dynamic Random Access Memory), DDR-SDRAM (Double Data Rate—Synchronous Dynamic Random Access Memory), DDR2-SDRAM, or DDR3-SDRAM. Alternatively, the memory device 710 may also be an external DIMM (Dual Inline Memory Module) memory. In the present embodiment, for example, the memory device 710 includes two DDR-SDRAMs having an operating voltage of 2.5 V. Generally, in the DDR-SDRAM, when a self-refresh signal is input, the DDR-SDRAM is set to be in a self-refresh state. The DDR-SDRAM in the self-refresh state can retain data with a current as small as a few mA.

Below, operations of the power supply device shown in FIG. 4 are explained.

In the usual operations of the not-illustrated apparatus having the power supply device as shown in FIG. 4, the usual power supply 707 is used to supply power to the memory device 710. Hence, in this state, the switching unit 703 is switched OFF by the switching controller 704 to stop power being supplied from the auxiliary power supply, that is, the secondary battery 702.

The output voltage of the usual power supply 707 is supplied to the step-down transformer, that is, a regulator circuit 709, through the second diode D2 of the power supply switching unit 708. In the present embodiment, the memory device 710 is formed from a DDR-SDRAM having an operating voltage of 2.5 V, and the 3.3 V output voltage of the usual power supply 707 is reduced by the regulator circuit 709 to 2.5 V.

Since a current of about 1 ampere flows in the circuit in the usual operations of the apparatus having the power supply device as shown in FIG. 4, a regulator circuit and diodes able to bear such a large current are used. In particularly, in the present embodiment, as described above, since a voltage of 2.5 V is generated from a voltage of 3.3 V, considering the difference between an input voltage and an output voltage of the later-stage regulator, a Schottky barrier diode is used as the second diode D2 of the power supply switching unit 708, which is characterized by a small difference between the input voltage and the output voltage.

Therefore, the power supply device of the present embodiment is configured to conduct a large current in the usual operations of the apparatus.

On the other hand, in backup operations of the apparatus having the power supply device as shown in FIG. 4, the auxiliary power supply, that is, the secondary battery 702, is used to supply the power voltage to the memory device 710. Hence, in this state, the switching unit 703 is switched ON by the switching controller 704, and the output voltage of the secondary battery 702 is supplied to the step-up transformer, that is, the DC-DC converter 706, through the switching unit 703.

In the present embodiment, the DC-DC converter 706 steps up the output voltage of the secondary battery 702 to the nominal output voltage of usual power supply 707. The stepped-up output voltage of the secondary battery 702 is supplied to the step-down transformer, that is, the regulator circuit 709, through the first diode D1 of the power supply switching unit 708; then the same as the usual operations, the regulator circuit 709 reduces the stepped-up output voltage of the secondary battery 702 to 2.5 V.

Since the secondary battery 702, which is used as the auxiliary power supply, has a limited power capacity, when the secondary battery 702 supplies power to the memory device 710, that is, when the secondary battery 702 discharges, the power (stored energy) of the secondary battery 702 decreases gradually. It is clear that the less the consumption of the power, the longer the back up time period.

When the memory device 710 is the DDR-SDRAM, the current flowing in the circuit is of a few amperes in the backup operations. Therefore, the power supply device of the present embodiment is configured to be able to reduce the power consumption of the secondary battery 702 by using the DC-DC converter 706 which has high efficiency with respect to a current as low as a few mA. According to the present embodiment, since the power supplied in the usual operations does not pass through the DC-DC converter 706, it is sufficient to only consider the backup operations when selecting the DC-DC converter 706.

In addition, the Schottky barrier diodes having a small voltage drop are used as the diodes D1 and D2, and low-saturation transistors are used as transistors of the power supply switching unit 708, so that it is possible to reduce the power loss in the backup operations, and to improve the efficiency of the power supply device. Further, since low-saturation regulators, which have a small consumption current and a small difference between the input voltage and the output voltage thereof, are used in the regulator circuit serving as the step-up transformer 706, it is possible to further reduce the power loss.

Since the flow of electrical power supplied in the usual operations and the flow of electrical power supplied in the backup operations are different from each other, it is possible to configure circuits satisfying requirements of different objects. Hence, it is possible to stably supply a 2.5 V operating voltage to the DDR-SDRAM constantly, and it is possible to back up the DDR-SDRAM so that data stored in the DDR-SDRAM can be reliably retained for a longer time.

Second Embodiment

Figure 5:
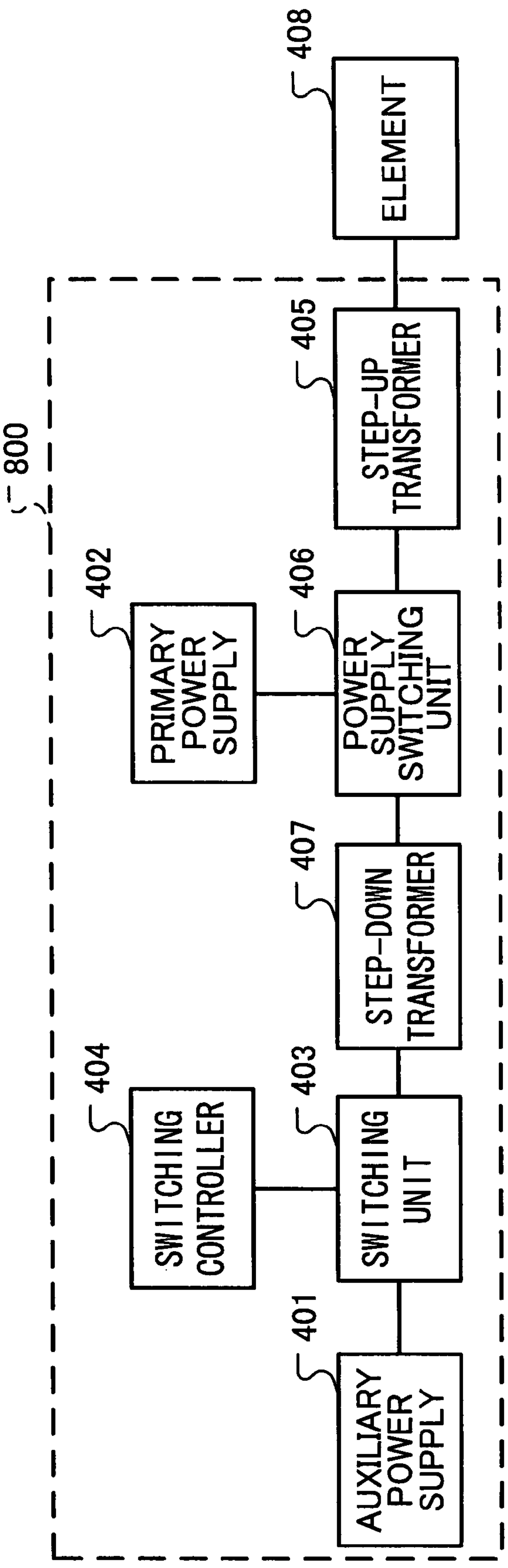
FIG. 5 is a block diagram illustrating an example of an overall configuration of a power supply device according to a second embodiment of the present invention.

FIG. 5 is a block diagram illustrating an example of an overall configuration of a power supply device according to a second embodiment of the present invention.

In the present embodiment, the same reference numbers are assigned to the same elements as those described previously, and overlapping descriptions are omitted.

As shown in FIG. 5, a power supply device 800 is used when the operating voltage of the device 408 is higher than the output voltage of the usual power supply 402. The power supply device 800 has basically the same configuration as the power supply device 400 of the first embodiment, except that positions of the step-up transformer 405 and the step-down transformer 407 are exchanged.

Next, operations of the power supply device 800 are explained with reference to FIG. 6A and FIG. 6B.

Figure 6A:
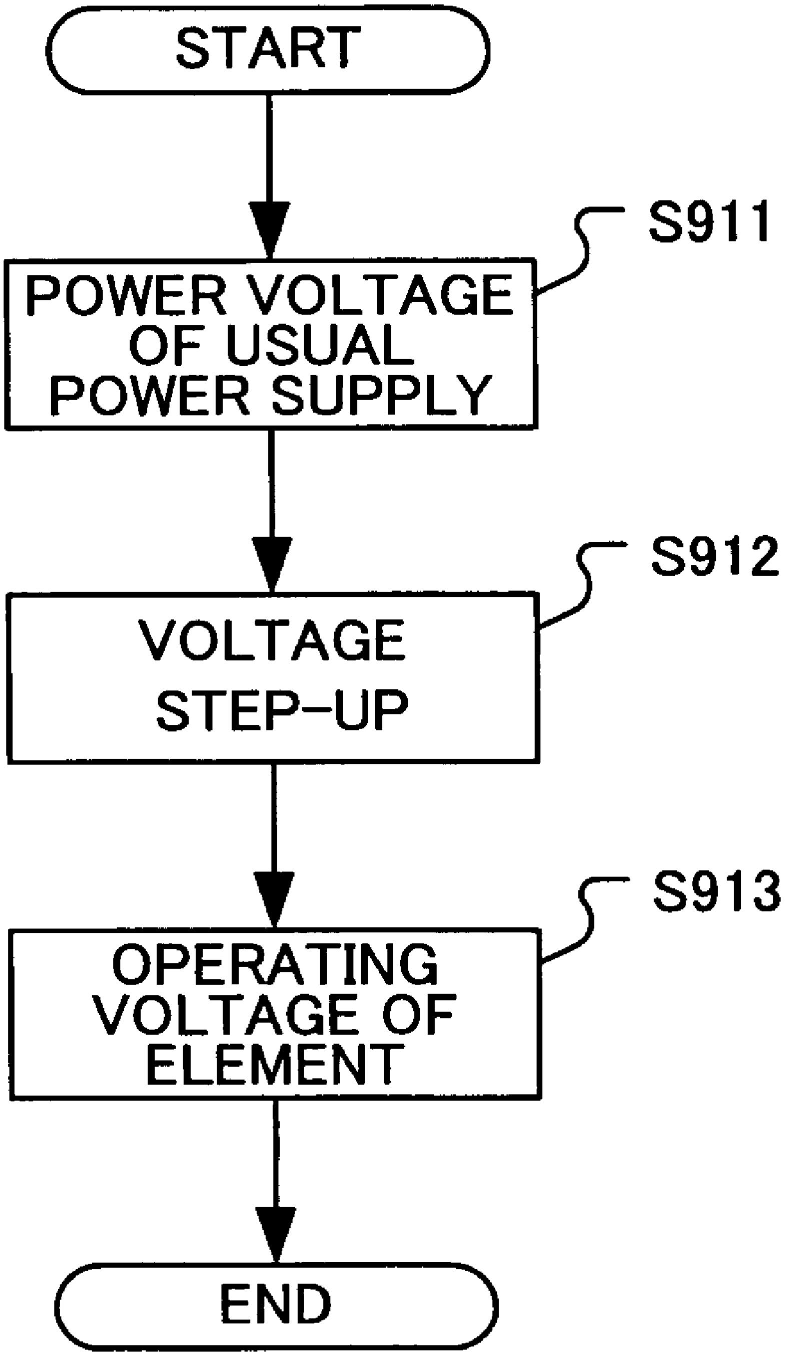
FIG. 6A is a flowchart illustrating usual operations of the power supply device 800 as shown in FIG. 5.

FIG. 6A is a flowchart illustrating usual operations of the power supply device 800 as shown in FIG. 5.

In the usual operations, the primary power supply 402 is used to supply the power voltage to the device 408.

In step S911, when the not-illustrated apparatus having the power supply device 800 is powered on, the primary power supply 402 supplies a DC (direct current) voltage generated from an AC (Alternating Current) power supply. This DC voltage is referred to as a “usual power voltage”.

In the present embodiment, the voltage (usual power voltage) from the primary power supply 402 is lower than the operating voltage of the device 408, which is to receive the power voltage.

In step S912, the usual power voltage is supplied to the step-up transformer 405 through the power supply switching unit 406. The step-up transformer 405 steps up the usual power voltage to the operating voltage of the device 408.

In step S913, the increased usual power voltage is supplied to the device 408 as the operating voltage of the device 408.

The above operations are carried out successively when the apparatus having the power supply device 800 is turned ON.

Figure 6B:
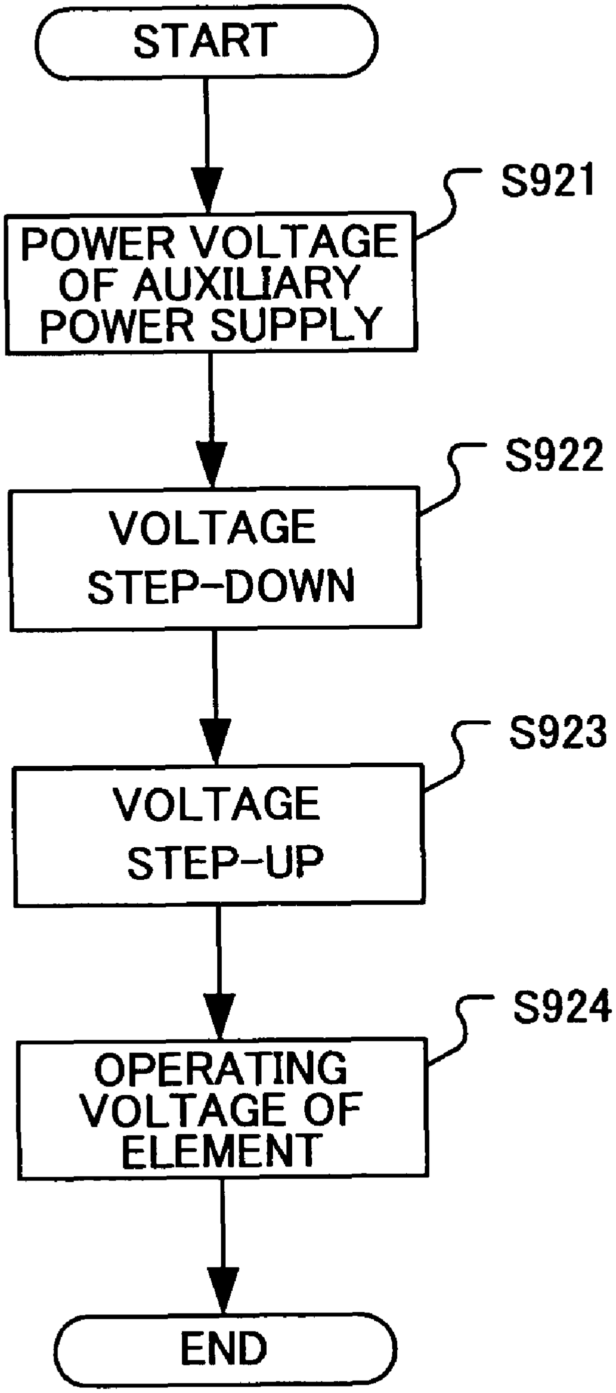
FIG. 6B is a flowchart illustrating backup operations of the power supply device 800 as shown in FIG. 5.

FIG. 6B is a flowchart illustrating backup operations of the power supply device 800 as shown in FIG. 5.

In the backup operations, the auxiliary power supply 401 is used to supply the power voltage to the device 408.

In step S921, when the apparatus having the power supply device 800 stops operations temporarily, the power voltage from the primary power supply 402 is interrupted, and the auxiliary power supply 401 supplies an auxiliary power voltage. As shown in FIG. 2, the auxiliary power voltage changes with time.

In step S922, The step-down transformer 407 steps down the auxiliary power voltage to a certain voltage. Since in the subsequent step, the stepped-down auxiliary power voltage is stepped up to the operating voltage of the device 408, preferably, the certain voltage of the stepped down auxiliary power voltage is not higher than the operating voltage of the device 408 and results in the minimum power loss in the step-up transformer 405. For example, in the present embodiment, it is set that the certain voltage equals the output voltage of the primary power supply 402.

In step S923, the stepped-down auxiliary power voltage is supplied to the step-up transformer 405 through the power supply switching unit 406. The step-up transformer 405 steps up the stepped-down auxiliary power voltage to the operating voltage of the device 408.

In step S924, the stepped-down and stepped-up auxiliary power voltage is supplied to the device 408 as the operating voltage.

The above operations are carried out successively in the backup operations of the apparatus having the power supply device 800.

Therefore, according to the present embodiment, even when the operating voltage of the device 408 is higher than the output voltage of the primary power supply 402, since the flow of electrical power supplied in the usual operations and the flow of electrical power supplied in the backup operations are different from each other, it is possible to configure circuits satisfying requirements of different operations objects, Hence, it is possible to minimize the electric power loss of the circuits and obtain high efficiency. When the power supply device has the configuration as shown in FIG. 5, the flow of electrical power in the usual operations only passes through the step-up transformer 405.

Preferably, the step-down transformer 407 is not a regulator circuit, but a DC-DC converter, and the DC-DC converter has high efficiency at a low operating current.

Third Embodiment

Figure 7:
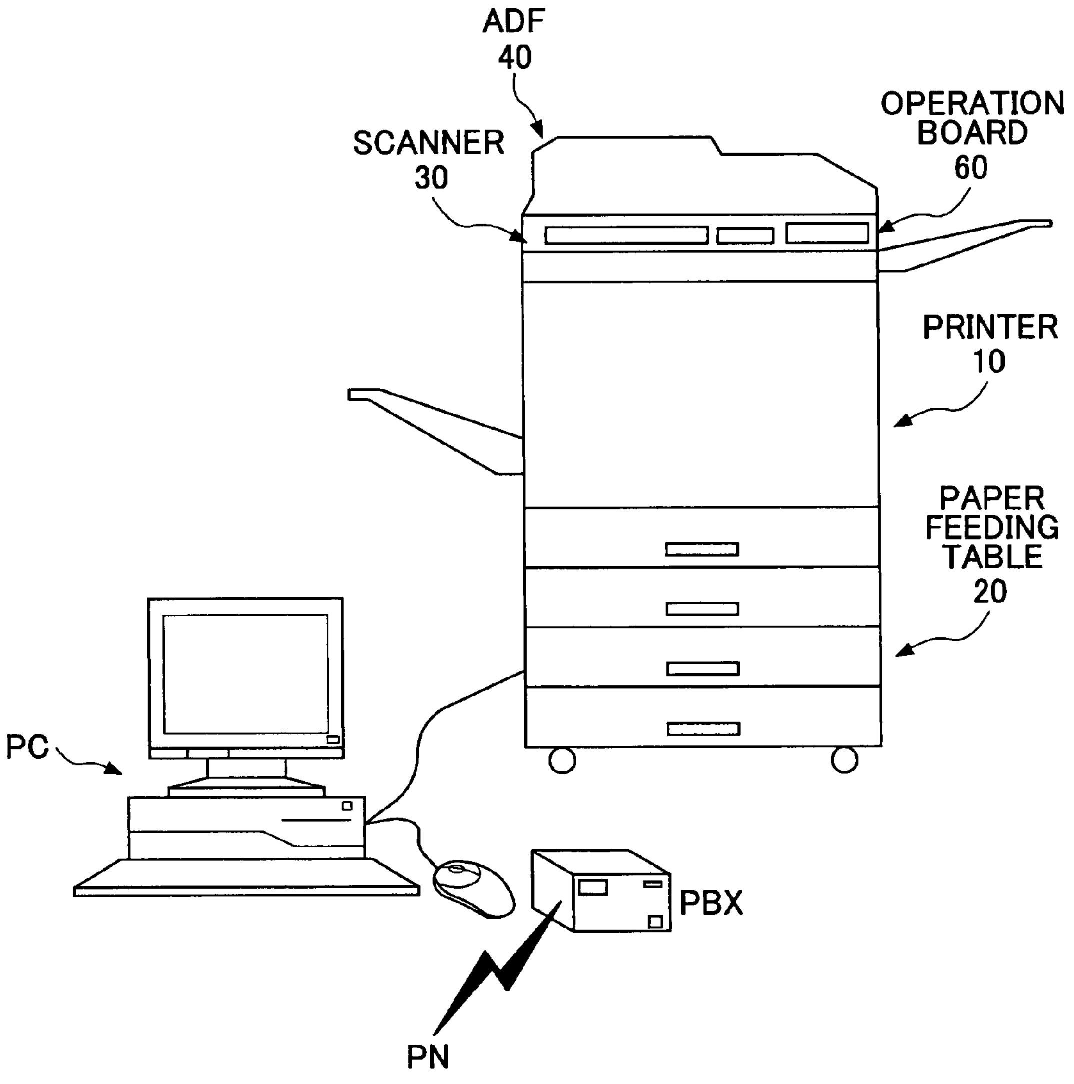
FIG. 7 is a schematic view illustrating an example of an image forming device according to a third embodiment of the present invention, which has a power supply device of the present invention.
Figure 8:
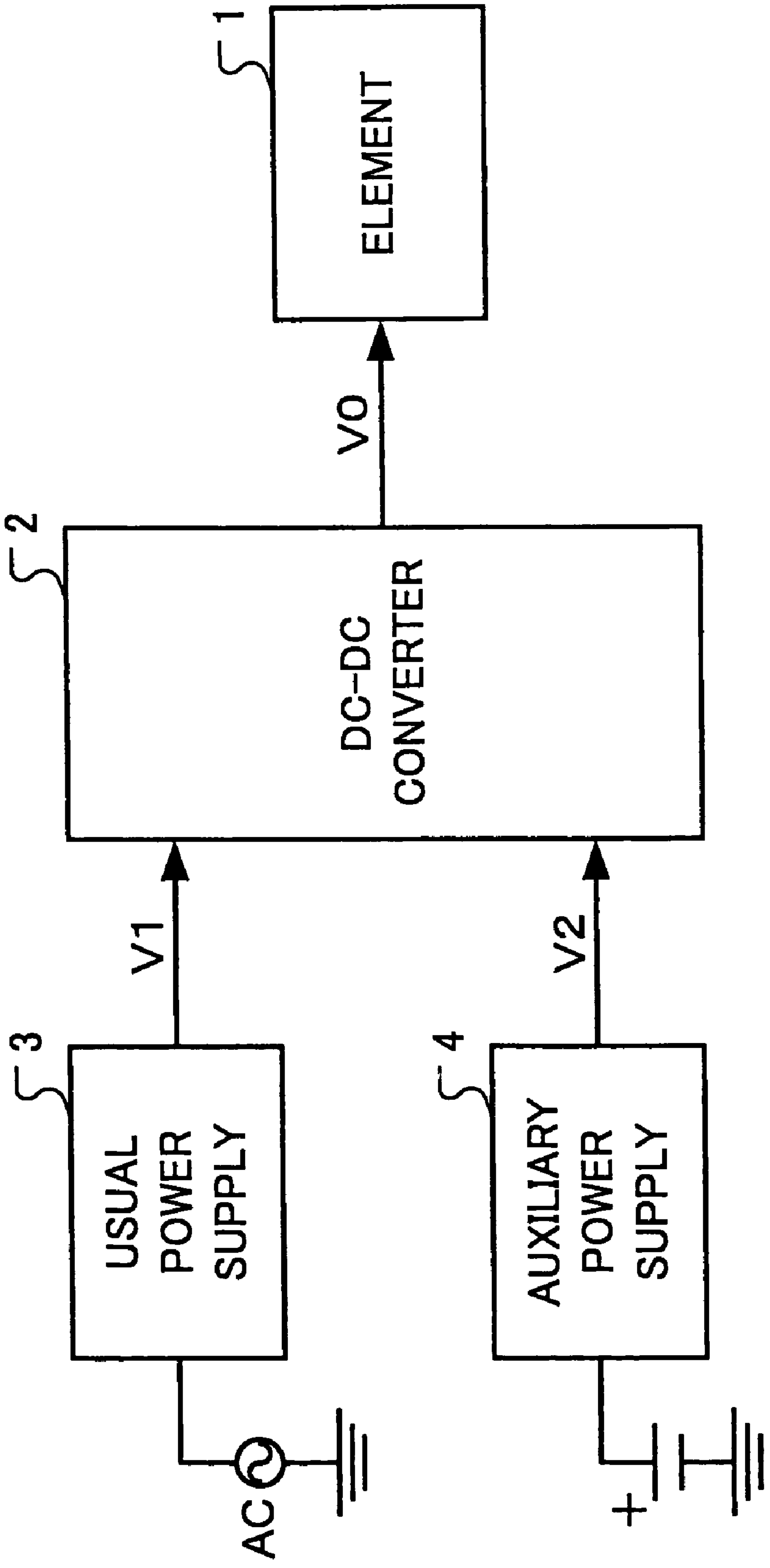
FIG.8 Prior Art
FIG. 8 is a block diagram illustrating a general circuit configuration for implementing the above power supply circuit technique.
Figure 9:
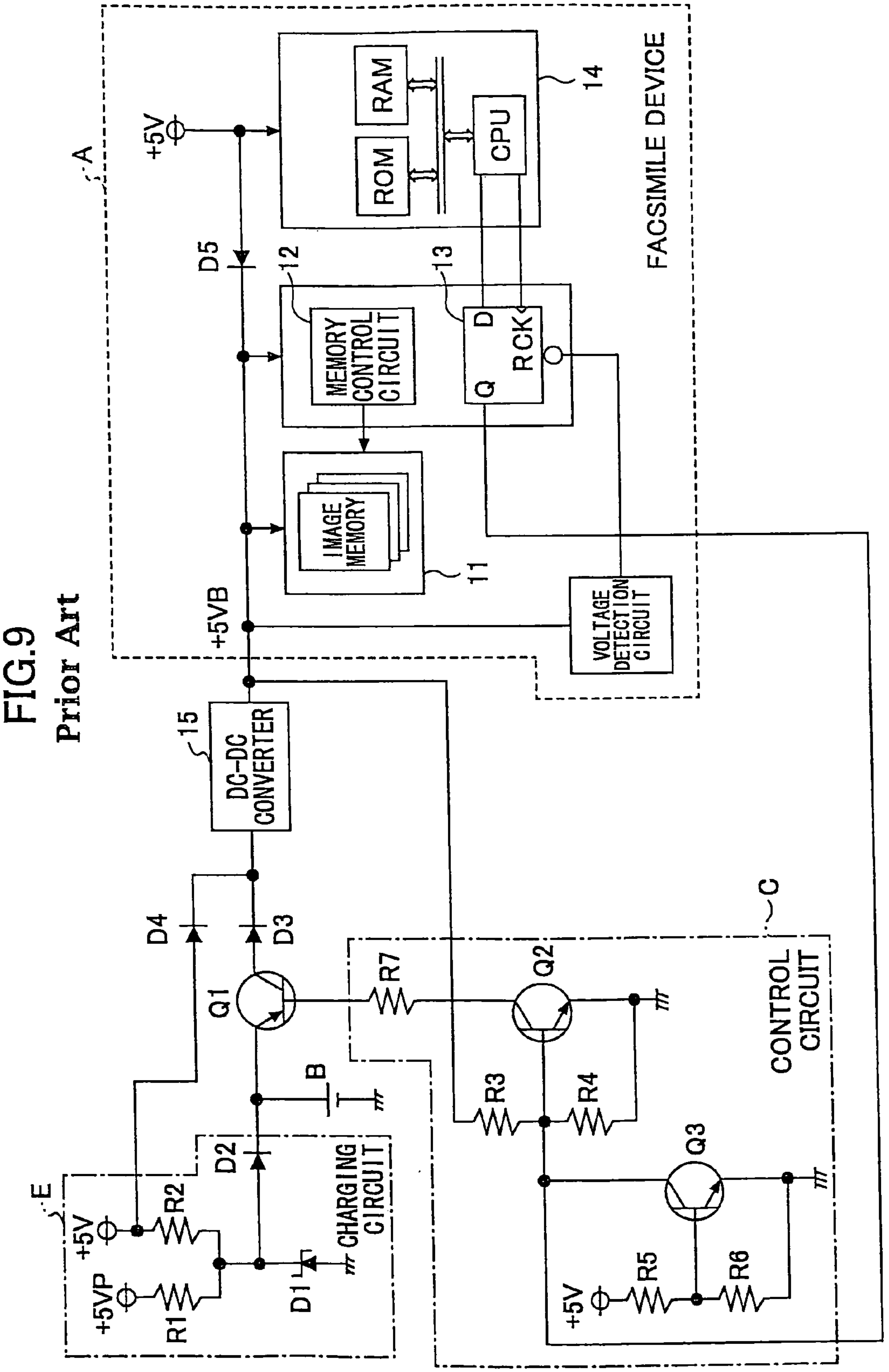
FIG.9 Prior Art
FIG. 9 is a circuit diagram illustrating an embodiment of the battery backup power supply circuit disclosed in reference 1.
Figure 10:
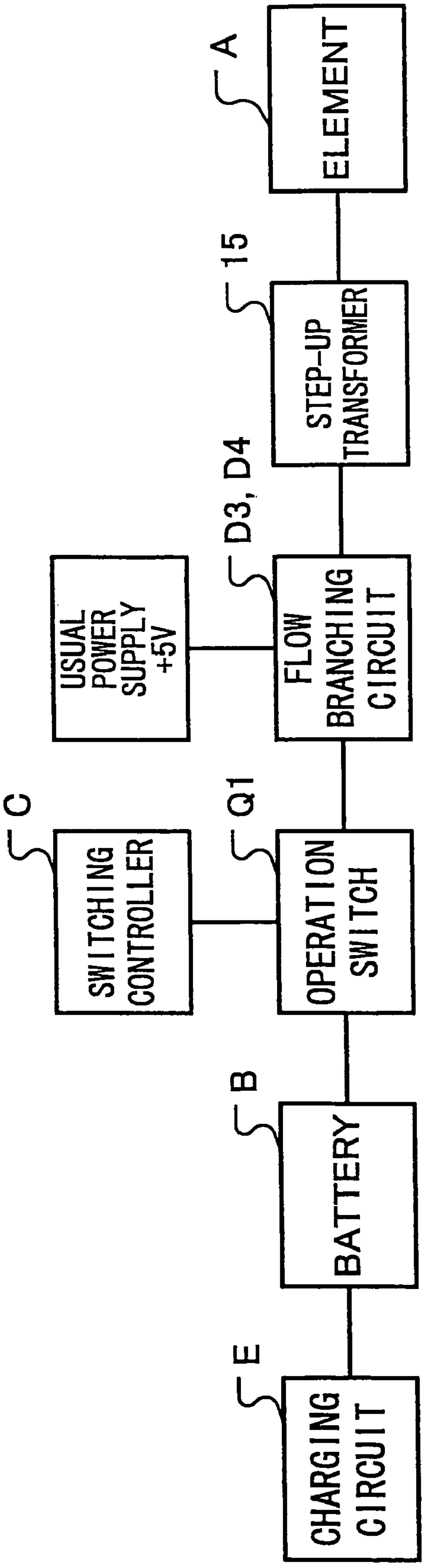
FIG.10 Prior Art
FIG. 10 is a block diagram illustrating a functional configuration of the battery backup power supply circuit as shown in FIG. 9.

FIG. 7 is a schematic view illustrating an example of an image forming device according to a third embodiment of the present invention, which has a power supply device of the present invention.

In the present embodiment, the power supply device of the present invention is installed in an image forming device, which has functions of backing up a memory so as to prevent data loss in the memory caused by sudden power failure or trouble in a power supply.

The image forming device shown in FIG. 7 is a multifunction peripheral, specifically, a full-color digital copier having multiple functions. The image forming device includes a color printer 10, a paper feeding table 20, a scanner 30, an automatic document feeder (ADF) 40, and an operational board 60.

The color printer 10 prints color image data.

The paper feeding table 20 supplies paper to the color printer 10 for color printing.

The scanner 30 reads a manuscript and obtains image data.

The automatic document feeder (ADF) 40 automatically feeds the manuscript to be read by the scanner 30.

The operational board 60 allows a user to operate the image forming device.

The image forming device shown in FIG. 7 includes a not-illustrated built-in system controller, and through the system controller, the image forming device is connected to a Local Area Network (LAN) in connection with personal computers (PC). For example, the system controller can be connected to a communication network like the Internet. Hence, the image forming device can communicate with a management server (not illustrated) provided in a management center located far away through the communication network, and exchange data with the management server.

The image forming device may further include a facsimile control unit (FCU) (not illustrated). The image forming device can be connected to switching equipment (PBX) outside the image forming device, and to a public communication network (PN) through the facsimile control unit, and carry out facsimile communication.

For example, consider the case in which sudden power failure occurs when the image forming device is in facsimile transmission; with the usual power supply off, the power supply device of the present invention operates to provide backup power for the memory which stores the received data or the data to be transmitted.

According to the present embodiment, the power supply device of the present invention is included in the image forming device. Due to this, when there are many circuit components, such as a memory, which ought to be backed up when the usual power of the image forming device is off, it is possible to back up a larger number of circuit components than with the battery backup power supply circuit in the related art, without changing circuit configurations and circuit scales. In addition, even when further progress is made in lowering the operating voltage and increasing the current of the circuit components, it is possible to easily meet the requirements of lowered voltages and increased current.

According to the present invention, since the voltage stepping-up and stepping-down operations are separate from each other, the one of the voltage stepping-up operation and the stepping-down operation which is earlier is optimized so that the power loss of the other one of the voltage stepping-up operation and the stepping-down operation which occurs at later stages is minimized. Thereby, it is possible to improve the efficiency of the power supply device while satisfying requirements of the device in connection.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, it is described that a single-cell lithium secondary battery is used as the auxiliary power supply, but a polymer lithium secondary battery or other kinds of secondary batteries may also be used. Further, a manganese dry battery or other primary batteries, and capacitors may also be used.

This patent application is based on Japanese Priority Patent Applications No. 2006-136610 filed on May 16, 2006, and No. 2007-097532 filed on Apr. 3, 2007, the entire contents of which are hereby incorporated by reference.

What is claimed is:

1. A power supply device, comprising:

a first power supply, a voltage step-up transformer that steps up an output voltage of the first power supply;

a voltage step-down transformer that steps down an output voltage of the voltage step-up transformer, and outputs the stepped-down voltage to a load;

wherein the voltage step-up transformer steps up the output voltage of the first power supply to an operating voltage of the load, wherein the stepped-up output voltage includes a voltage equal to a voltage that is stepped-down by the voltage step-down transformer, and wherein a lower limit of the operating voltage of the load is obtained by deducting the voltage stepped-down by the voltage step-down transformer from the stepped-up output voltage;

a second power supply that supplies electric power in a usual operation of the power supply device; and a power supply switching unit that, when the second power supply stops supplying power and the first power supply starts to supply electric power, switches its output to the output voltage of the first power supply stepped up by the voltage step-up transformer from an output voltage of the second power supply, and supplies the output voltage of the first power supply to the voltage step-down transformer.

2. The power supply device as claimed in claim 1, further comprising:

a switch that is provided on an output side of the first power supply, and controls the output voltage of the first power supply.

3. The power supply device as claimed in claim 1, wherein the power supply switching unit includes a first diode that is provided on the output side of the first power supply and is in a forward state, and a second diode that is provided on the output side of the second power supply and is in the forward state.

4. The power supply device as claimed in claim 1, wherein the first power supply is a battery or a capacitor.

5. An image forming device, comprising:

the power supply device of claim 1.

6. The image forming device of claim 5, further comprising:

a printer configured to print image data, a scanner configured to read a manuscript as the image data, a facsimile control unit configured to carry out facsimile communication, wherein the power supply device is configured to supply power to the printer, the scanner and the facsimile control unit.

7. An image forming device, comprising:

a power supply device, wherein the power supply device includes a first power supply, a voltage step-up transformer that steps up an output voltage of the first power supply;

a voltage step-down transformer that steps down an output voltage of the voltage step-up transformer, and outputs the stepped down voltage to a load;

wherein the voltage step-up transformer steps up the output voltage of the first power supply to an operating voltage of the load, wherein the stepped-up output voltage includes a voltage equal to a voltage that is stepped-down by the voltage step-down transformer, and wherein a lower limit of the operating voltage of the load is obtained by deducting the voltage stepped-down by the voltage step-down transformer from the stepped-up output voltage;

a second power supply that supplies electric power in a usual operation of the power supply device: and a power supply switching unit that, when the second power supply stops supplying power and the first power supply starts to supply electric power, switches its output to the output voltage of the first power supply stepped up by the voltage step-up transformer from an output voltage of the second power supply, and supplies the output voltage of the first power supply to the voltage step-down unit.

8. The image forming device as claimed in claim 7, the power supply device further comprises:

a switch that is provided on an output side of the first power supply, and controls the output voltage of the first power supply.

9. The image forming device as claimed in claim 7, wherein the power supply switching unit includes a first diode that is provided on the output side of the first power supply and is in a forward state, and a second diode that is provided on the output side of the second power supply and is in the forward state.

10. The image forming device as claimed in claim 7, wherein the first power supply is a battery or a capacitor.

11. The image forming device of claim 7, further comprising:

a printer configured to print image data, a scanner configured to read a manuscript as the image data, a facsimile control unit configured to carry out facsimile communication, wherein the power supply device is configured to supply power to the printer, the scanner and the facsimile control unit.

12. A power supply device, comprising:

a first power supply, a voltage step-down transformer that steps down an output voltage of the first power supply;

a voltage step-up transformer that steps up an output voltage of the voltage step-down transformer, and outputs the stepped-up voltage to a load, wherein the voltage step-down transformer steps down the output voltage of the first power supply to an operating voltage of the load;

a second power supply that supplies electric power during a normal operation of the power supply device; and a power supply switching unit that, when the second power supply stops supplying power and the first power supply starts to supply electric power, switches its output to the output voltage of the first power supply stepped down by the voltage step-down transformer from an output voltage of the second power supply, and supplies the output voltage of the first power supply to the voltage step-up transformer.

13. An image forming device, comprising:

the power supply device of claim 12.

14. The image forming device of claim 13, further comprising:

a printer configured to print image data, a scanner configured to read a manuscript as the image data, a facsimile control unit configured to carry out facsimile communication, wherein the power supply device is configured to supply power to the printer, the scanner and the facsimile control unit.

15. An image forming device, comprising:

a power supply device, wherein the power supply device includes a first power supply, a voltage step-down transformer that steps down an output voltage of the first power supply;

a voltage step-up transformer that steps up an output voltage of the voltage step-down transformer, and outputs the stepped-up voltage to a load;

wherein the voltage step-down transformer steps down the output voltage of the first power supply to an operating voltage of the load:

a second power supply that supplies electric power during a normal operation of the power supply device; and a power supply switching unit that, when the second power supply stops supplying power and the first power supply starts to supply electric power, switches its output to the output voltage of the first power supply stepped down by the voltage step-down transformer from an output voltage of the second power supply, and supplies the output voltage of the first power supply to the voltage step-up transformer.

16. The image forming device of claim 15, further comprising:

a printer configured to print image data, a scanner configured to read a manuscript as the image data, a facsimile control unit configured to carry out facsimile communication, wherein the power supply device is configured to supply power to the printer, the scanner and the facsimile control unit.

* * * * *